United States Patent Office 3,442,565
Patented May 6, 1969

3,442,565
STORAGE APPARATUS
Guy Baron Boyce, Blagdon, England, assignor to Binks-Bullows Limited
Filed July 1, 1967, Ser. No. 651,921
Claims priority, application Great Britain, July 7, 1966, 30,559/66
Int. Cl. A47b *95/00, 53/00;* F16l *3/16*
U.S. Cl. 312—319                                2 Claims

ABSTRACT OF THE DISCLOSURE

Storage apparatus, especially for elongated articles such as hoses, which includes a housing, a plurality of spaced guides mounted in the housing and a plurality of article-supporting members which are supported by a cord which is engaged on one side by the spaced guides and on the opposite side by the article-supporting members so that any one of said members can be moved from a stored position adjacent to said guides to a position remote from the guides in which a loop is formed in the cord between a pair of adjacent guides, all the other article-supporting members then being supported by the cord in positions adjacent to said guides.

---

This invention relates to storage apparatus which is especially but not exclusively adapted for use in storing elongated flexible articles and has as its object the provision of such apparatus in a convenient form.

In its broadest aspect, the invention consists in storage apparatus which comprises a housing a plurality of guides mounted in a spaced relation in the housing, a cord which passes over said guides so that one side of the cord is engaged by the guides, and a plurality of article-supporting members which are each provided with a pulley arranged to engage the opposite side of said cord, each article-supporting member being movable between a stored position in which it lies adjacent to a pair of adjacent guides and a position in which its pulley is supported on a loop of cord extending between said pair of adjacent guides, a sheave incorporated in each article-supporting member over which in use the associated article extends, an arm mounted on each sheave so as to be pivotable about the axis of rotation of the sheave and which carries at its outer end a roller which is arranged so that in use an elongated article to be supported by the sheave will pass between the sheave and the roller, the arrangement being such that any one of the article-supporting members can be moved away from its stored position to form a loop in the cord whereas subsequently any one of the other article-supporting members can be moved away from its stored position to form another loop in the cord whilst contracting the existing loop and retracting the first article-supporting member.

Conveniently, said guides comprise further pulleys and preferably where the apparatus is designed for use with elongated flexible articles each article-supporting member incorporates a sheave over which the elongated article (such as a hose) extends, the arrangement being such that one end of said article is fixed so that the article-supporting member can be pulled out relative to said guides by pulling the other, free end of the article.

Figure 1:
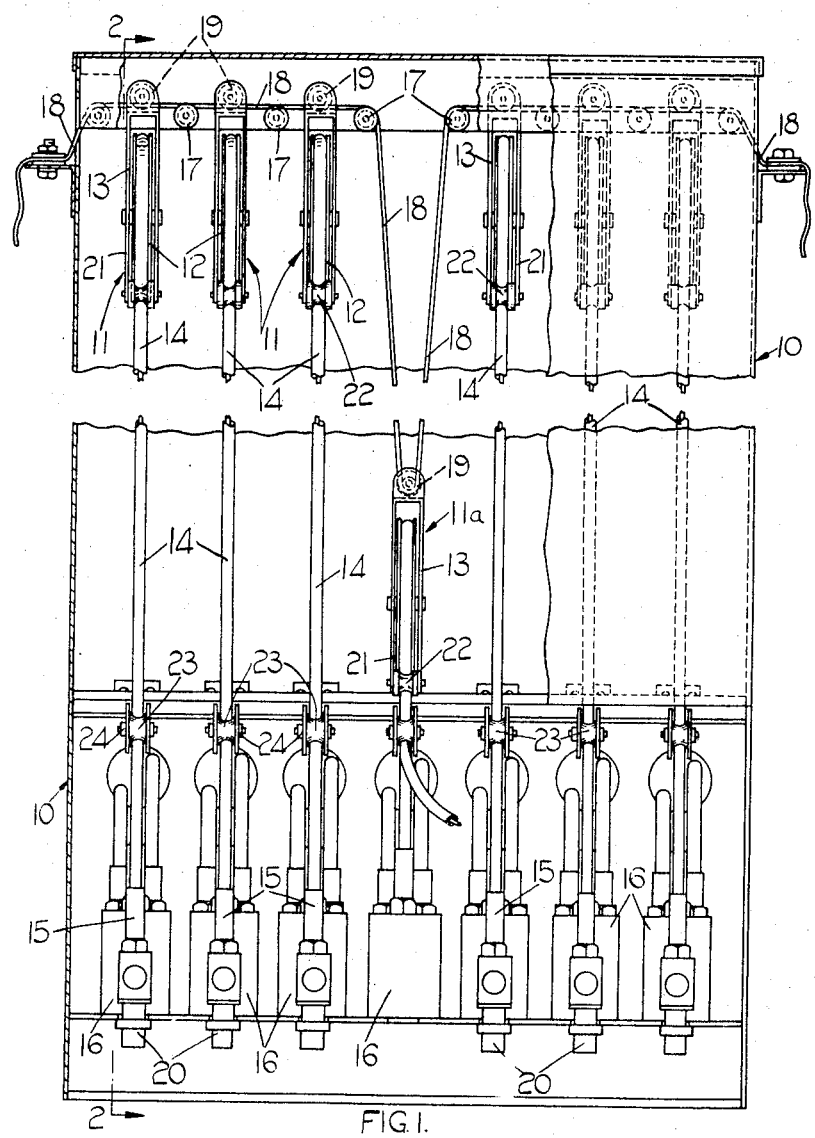
Figure 2:
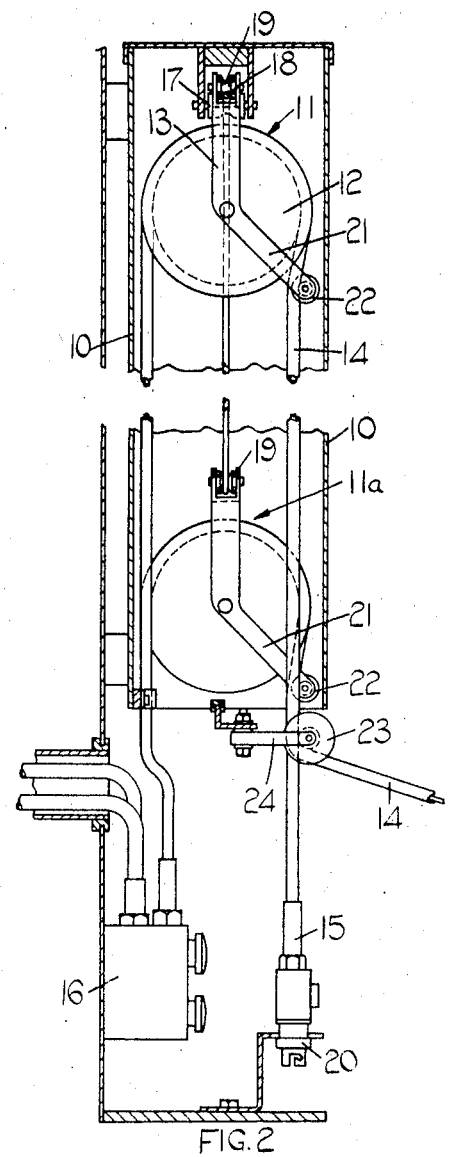

The invention will now be more particularly described with reference to the accompanying drawing wherein FIGURE 1 is a front view of one example of storage apparatus constructed in accordance with the invention, and FIGURE 2 is a sectional view taken on the line 2—2 of FIGURE 1.

Referring now to the drawings, the apparatus shown therein is designed for use in storing elongated flexible articles such as hoses. For example in the painting of manufactured articles at the end of a production line it may be desired to paint any particular article in a specified colour of a variety of colours and to this end there may be provided a plurality of paint containers to each of which is attached a hose adapted for connection at its free end to a spray gun. It may therefore be necessary to change the hose connection to the spray gun at frequent intervals and apparatus in accordance with the present invention can be used to ensure that the different hoses are not left lying on the floor when not in use where they may become entangled with each other and damaged.

In the example now described there is provided a housing 10 which is open at its lower end. In said housing there are disposed a plurality of article-supporting members 11 which are each provided with a sheave 12 rotatably supported in a strap 13 so that a hose 14 can be passed over said sheave with the free end 15 of the hose disposed at the bottom of the housing, the other end of the hose being connected to an associated valve 16 (which is itself connected to a container) so that it is fixed.

At the upper end of said housing there is provided a plurality of guides which are each in the form of a pulley 17 said pulleys being spaced apart in a horizontal direction and being each arranged so that they are capable of rotation relative to the housing 10 about a horizontal axis. There is also provided a cord 18 or other flexible element which is secured at its two ends and which passes over the upper sides of said pulleys 17, the length of said cord being such however as to permit a downwardly extending loop to be formed between any pair of adjacent pulleys 17.

Each of said article-supporting members is also provided at its upper end with a pulley 19 which engages the aforesaid cord 18 so that the latter will pass over all the aforementioned guide pulleys 17 (which are fixed relative to the housing) and beneath the pulleys 19 of the article-supporting members. Each article-supporting member is thus movable between an upper position in which it lies adjacent to a pair of adjacent guide pulleys 17 and a lower position indicated by reference numeral 11ᵃ in which it is spaced from said guide pulleys and it will be appreciated that any one article-supporting member can be pulled downwardly to form a loop in the cord between a pair of adjacent guide pulleys. When any one article-supporting member is therefore pulled downwardly to the maximum extent all the other article-supporting members will be disposed in their raised positions. If it is then desired to change the hose being used the selected hose is pulled down and connected to the spray gun (as by means of a bayonet coupling 20) after the hose previously in use has been disconnected. The pulling down of the new hose will thus form another loop and this will have the effect of contracting the first loop and thereby retracting the article-supporting member associated therewith. Thus only one hose will be in the withdrawn position at any one time and this will prevent the hoses from becoming entangled with each other or soiled or damaged.

Furthermore, there is preferably provided in association with each article-supporting member 11 an arm 21 which is pivoted on the axis of rotation of the sheave 12 of said member, said arm 21 having at its outer end a roller 22 arranged so that the free end of the hose will engage the inner side of the roller whilst the outer side of the roller will be disposed near to or will engage the adjacent part of the wall of the housing 10. The free end of the hose is then led downwardly to a further roller 23 which is connected to an arm 24 pivotable about a vertical axis so that the end of the hose can be easily pulled in any required direction. The provision of the arm 21 pivoted on the sheave as above described and the associated roller 22 will result in the sheave and said roller being displaced sideways in directions such that when the free end of the hose is pulled downwardly the sheave will engage one side of the housing and the roller will engage the other side of the housing so that both sheave and roller will roll downwardly inside the housing.

The apparatus as above described thus provides a simple yet effective method of storing a plurality of hoses in such a way that they do not become soiled, damaged or entangled with each other when not in use. It is also to be understood that the apparatus can be used for the storage of articles other than hoses.

Having thus described my invention what I claim as new and desire to secure by Letters Patent is:

1. Storage apparatus comprising a housing, a plurality of guides mounted in a spaced relation in the housing, a cord which passes over said guides so that one side of the cord is engaged by the guides, and a plurality of article-supporting members which are each provided with a pulley arranged to engage the opposite side of said cord, each article-supporting member being movable between a stored position in which it lies adjacent to a pair of adjacent guides and a position in which its pulley is supported on a loop of cord extending between said pair of adjacent guides, a sheave incorporated in each article-supporting member over which in use the associated article extends, an arm mounted on each sheave so as to be pivotable about the axis of rotation of the sheave and which carries at its outer end a roller which is arranged so that in use an elongated article to be supported by the sheave will pass between the sheave and the roller, the arrangement being such that any one of the article-supporting members can be moved away from its stored position to form a loop in the cord whereas subsequently any one of the other article-supporting members can be moved away from its stored position to form another loop in the cord whilst contracting the existing loop and retracting the first article-supporting member.

2. Storage apparatus as claimed in claim 1 wherein each sheave is arranged so that its axis is horizontal or substantially horizontal and wherein there is associated with each sheave a further roller which is disposed below the sheave and which is mounted at one end of a further arm pivotally mounted at its other end so as to be pivotable about a vertical or substantially vertical axis.

References Cited

UNITED STATES PATENTS

| | | | |
|---|---|---|---|
| 1,238,514 | 8/1917 | Hartbeck | 312—319 |
| 2,768,522 | 10/1956 | Henke | 248—75 X |
| 2,261,036 | 10/1941 | Pieper | 32—22 |

CHANCELLOR E. HARRIS, *Primary Examiner.*

U.S. Cl. X.R.

248—51